United States Patent
Nieminen et al.

(10) Patent No.: US 7,313,388 B2
(45) Date of Patent: Dec. 25, 2007

(54) PROVIDING SERVICES TO GROUPS OF SUBSCRIBERS

(75) Inventors: Petri Nieminen, Pirkkala (FI); Jukka Ahonen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/475,028

(22) PCT Filed: Apr. 10, 2002

(86) PCT No.: PCT/IB02/02168

§ 371 (c)(1),
(2), (4) Date: Apr. 9, 2004

(87) PCT Pub. No.: WO02/084985

PCT Pub. Date: Oct. 24, 2002

(65) Prior Publication Data

US 2004/0157605 A1    Aug. 12, 2004

(30) Foreign Application Priority Data

Apr. 10, 2001   (GB) ................................. 0108995.2

(51) Int. Cl.
*H04M 3/22* (2006.01)
(52) U.S. Cl. .................... 455/414.1; 455/405; 455/406
(58) Field of Classification Search ............ 455/414.1, 455/405, 406, 414.31
See application file for complete search history.

(56) References Cited

U.S. PATENT DOCUMENTS 6,055,305 A * 4/2000 Norman et al. ........ 379/211.01
6,169,891 B1 * 1/2001 Gorham et al. ............. 455/408
6,173,171 B1 * 1/2001 Plush et al. ................. 455/408
6,295,447 B1 * 9/2001 Reichelt et al. ............. 455/417

FOREIGN PATENT DOCUMENTS

| EP | 0 491 244 A2 | 6/1992 |
| GB | 2 284 519 A | 6/1995 |
| JP | 08-500956 | 1/1996 |
| JP | 08-265429 | 10/1996 |

(Continued)

OTHER PUBLICATIONS

People's Republic of China Office Action mailed Oct. 14, 2005.

(Continued)

*Primary Examiner*—Jean Gelin
*Assistant Examiner*—Pierre-Louis Desir
(74) *Attorney, Agent, or Firm*—Squire, Sanders & Dempsey L.L.P.

(57) ABSTRACT

A communications system for providing services to communication terminals, each terminal being addressable by means of an address, the communications system comprising: a service provision unit for providing services to the terminals; and a service data storage unit for storing a set of service provision definitions, each service provision definition comprising a service field storing an indication of a service and an address field storing an expression specifying the address of one or more of the terminals; and a service logic unit arranged to receive communications in the system and compare an address specified in a communication with the expressions stored in the address field of each of the service provision definitions and on the basis of that comparison causing the service provision unit to provide a service to the terminal identified by the said address.

20 Claims, 7 Drawing Sheets

FOREIGN PATENT DOCUMENTS

| | | |
|---|---|---|
| JP | 09/046421 | 2/1997 |
| JP | 09/200814 | 7/1997 |
| JP | 2000-115822 | 4/2000 |
| WO | WO 95/021688 | 1/1995 |
| WO | 99/040710 | 8/1999 |
| WO | WO 00/69199 | 11/2000 |

OTHER PUBLICATIONS

Japanese Office Action dispatched Oct. 11, 2005 with partial English translation.
English translation of People's Republic of China Office Action dated Jun. 10, 2005.

* cited by examiner

Subscriber's ProvisionId search

Group member search

Possible short number search

Member analysis chart

Member found flowchart for number translation

PROVIDING SERVICES TO GROUPS OF SUBSCRIBERS

This invention relates to providing services in a communications system, and especially to providing services to groups of subscribers.

The operator of a communication system such as a mobile telephone network can provide services to subscribers to the system. Individual subscribers may choose to pay for different services. In addition, services may be provided to groups of subscribers, either as a result of their having subscribed jointly to those services, or otherwise: for example as a promotion directed to a group of subscribers. Such services are typically, but not necessarily, provided by way of an intelligent network arrangement, The provision of some services may be initiated by a call from the subscriber's terminal. Examples of those services are weather reports and sending of e-mails. The provision of other services may be initiated by a call to the subscriber's terminal. Examples of those services are call diversion and voice mail.

When a call is being processed by the network, the network must decide whether the relevant service can be provided in that instance. To do this it must check whether the subscriber in question is allowed to receive the service. One way to do this is to query the account details stored for the subscriber. However, if that system is adopted it is highly inconvenient to configure the system to provide or deny additional services to groups of subscribers since the account details of each of the subscribers in the group must be altered. For example, it can be envisaged that as a promotional offer companies may wish to provide groups of subscribers with access to a service for a short period. In the arrangement outlined above, the accounts of all the subscribers in the group would have to be modified to permit the service to be provided, and then when the promotion expired they would all have to be modified again to deny the service.

There is a need for an improved system for determining which subscribers are to be provided with services.

According to one aspect of the present invention there is provided a communications system for providing services to communication terminals, each terminal being addressable by means of an address, the communications system comprising: a service provision unit for providing services to the terminals; and a service data storage unit for storing a set of service provision definitions, each service provision definition comprising a service field storing an indication of a service and an address field storing an expression specifying the address of one or more of the terminals; and a service logic unit arranged to receive communications in the system and compare an address specified in a communication with the expressions stored in the address fields of each of the service provision definitions and on the basis of that comparison causing the service provision unit to provide a service to the terminal identified by the said address.

Preferably at least one of the said service provision definitions stores an expression specifying the address of more than one terminal. Most preferably the said expression is a wildcard expression. Alternatively, or in addition, the expression may take the form of a list of addresses or wildcard expressions. The said expression suitably defines a set of numerically contiguous addresses, most preferably a set of addresses of which the first part of each is the same.

Suitably each address is a number. For example, each address may comprise be or may comprise an MSISDN.

The communication may, for example, be a voice and/or text and/or video communication.

The terminals may be mobile stations.

The service provision unit is preferably capable of providing a service whereby part or all of the charge of the call is directed to a sponsoring party distinct from the subscribers of the terminals. In that way a person may conveniently sponsor the cost of the call.

The service logic unit is suitably arranged to, if the said address matches the expression stored in the address field of any of the service provision definitions, cause the service provision unit to provide the service indicated in that definition. Alternatively, the service logic unit may be arranged to, if the said address matches the expressions stored in the address field of more than one of the service provision definitions, prioritise the services indicated in those definitions according to predetermined rules and on the basis of those rules cause the service provision unit to provide a subset of the services indicated in those definitions. The service logic unit may be arranged to cause the service provision unit to provide the service/services indicated in that/those definitions to a party to the communication.

The service logic unit may be arranged to compare the address of the originating party of the communication with the expressions stored in the address fields of each of the service provision definitions and on the basis of that comparison causing the service provision unit to provide a service to the terminal identified by the said address. The said address is suitably an A number.

The service logic unit may be arranged to compare the address of the terminating party of the communication with the expressions stored in the address fields of each of the service provision definitions and on the basis of that comparison causing the service provision unit to provide a service to the terminal identified by the said address. The said address may be a B number.

Preferably the communications system accords to the GSM standard or a derivative thereof.

The present invention will now be described by way of example with reference to the accompanying drawings, in which FIG. 1 illustrates a communications system according to the present invention;

The present invention will be described with reference to a GSM (Global System for Mobile Communications) system, but the present invention is not limited to such systems. In the GSM system, when a call is made from one terminal to another the number of the calling terminal is termed the A number and the number of the called terminal is termed the B number. In the GSM system, "numbers" of this type are MSISDN numbers, which are carried in a-call as part of a "long number". Analogous subscriber identifiers are used in other systems.

When a call is made, the call data includes the A number and the B number. Those numbers are therefore available for analysis to determine whether services should be provided as a result of the call.

Figure 1:
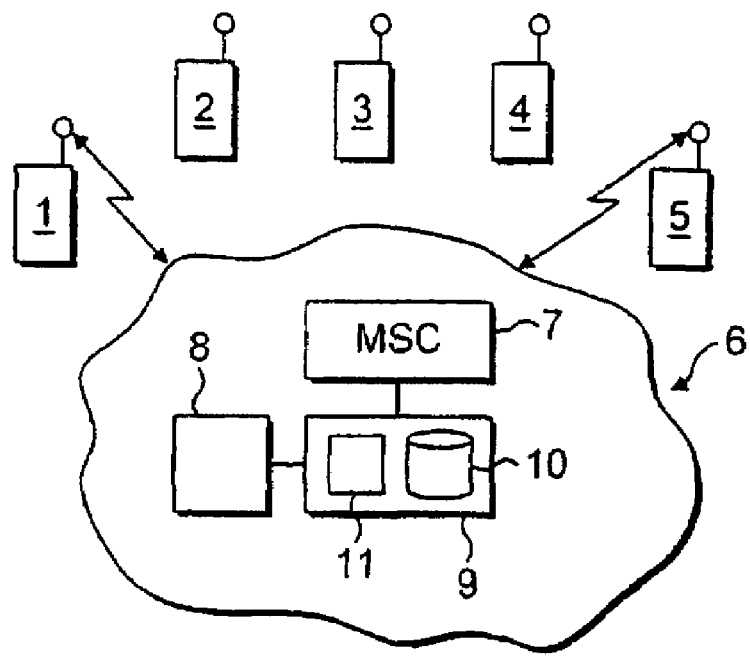

FIG. 1 illustrates a communications system according to the present invention. The system includes a number of terminals 1-5 which are capable of wireless communication with network-side units indicated generally at 6. The network-side units include an MSC (mobile switching centre)

7, at least one service provision unit 8 and a service control block 9. The service control block includes a service database 10 and a service logic unit 11. The service control block is connected to the MSC 7 to receive call data from the MSC, and to the service provision unit 8 for causing the service provision unit to provide services.

When the MSC 7 receives a call in response to which a service may need to be provided, data on the call is sent to the service control subsystem. That data includes at least one of the A and the B subscriber numbers. At the service control subsystem the service database stores a set of definitions which together define what services may be provided to which terminals. Each definition includes an indication of the service to which it relates (or of more than one service) and an expression indicating one or more subscriber numbers. The subscriber number(s) are tested against the expression in the definitions to determine whether a service may be provided to the call (e.g. voice mail) or in response to the call (e.g. a weather report). If the definitions indicate that a service can be provided then the service control subsystem authorises the service provision unit to provide the service. If more than one service can be provided then they are prioritised according to a predetermined hierarchy, so no all the services that are matched have to be provided.

Since an expression can indicate more than one subscriber number it is easy to configure the service control subsystem to permit the provision of services to a group of terminals.

The implementation of the present invention will now be described in more detail.

This implementation illustrates the application of the above principle to the allocation of services corresponding to a VPN (virtual private network) or PBX (private branch exchange). Often subscriber numbers within a VPN or PBX will have digits in common (usually their initial digits) with the specific numbers within the VPN or PBX being identified by other digits (usually the final digits). It is particularly easy to form an expression for a service definition that defines such a group, since the definition needs only to refer to the common digits. It will be appreciated that more complex forms of definition could be used to define groups of non-contiguous numbers. Groups that are unrelated to VPNs or PBXs could be defined.

In a preferred embodiment at least one of the definitions does include an expression that specifies more than one subscriber number. One simple way to specify more than one subscriber is to use wildcards in the expression. Thus, the expression "+35840*" specifies a group of numbers all of which begin +35840, such as +3584012345 and +3584098765. Another way to express a contiguous group of numbers is by specifying the uppermost and lowermost numbers of the group. Alternatively, a group could be specified as a list of numbers and/or wildcard expressions.

Where the service definitions indicate that more than one service may be provided on the basis of one or both of the A and B numbers, a selection may be made between those services on the basis of a predetermined set of priorities. For example, if the analysis indicates that a plurality of tariffs may be applied to the call then the priorities may indicate that the lowest of those tariffs is to be applied to the call.

In some circumstances a service, such as a reduced tariff may be applicable only if both the A and B subscribers are members of a common group. One example of this is where a company has arranged a reduced tariff for calls between its employees.

This description covers the implementation principles of features to support the feature of "VPN Large Number Ranges/PBX support". This feature enables provisioning of IN services to number ranges and performance improvements for calls originated by a PBX which may send incomplete digits of the destination number/address or from which the destination digits may be delayed beyond initial digits of the address.

The VPN is becoming a more and more widely used IN service in the market. A VPN service is typically targeted to corporate customers which may have PBXs serving thousands of subscribers. This means that when all PBX extension numbers should have VPN service, in prior art solutions all extension numbers are needed to be provisioned one by one. This requires lot of time for routing and space in the address database. The present feature enables only one entry to provision VPN services to the whole PBX or for a certain number range in the domain of the PBX.

In this description, the term subsystem refers to a part of the system that has its own separately definable function. Subsystems can be divided further into program blocks. The notation short number 74* or 74 indicates a short number range (by the starting digits of the short number). The notation long number 35832574* or 35832574 indicates a directory number range (by the starting digits of the directory number).

The present feature represents an extension to the current IN concept. The extension is such that a number range is considered as a subscriber. Thus, all operations that can be performed for individual subscribers, can be performed for number ranges as well. Performance improvement is achieved with more efficient search algorithm and more specific configuration of group member numbers.

Number ranges are defined as group members in the group, with the exception that number ranges contains number translations rule. With this number translation rule it is possible to resolve the long number based on the prefix of a short number and vice versa. The following example illustrates the idea of the number translation:

There is a PBX that has short numbers from 77000 to 77999. Respectively, short numbers are converted into long numbers in a way that 77000 is converted to 35832577000, 77001 to 35832577001 etc. Respectively, long numbers are converted into short numbers in the same way. Thus, the number translation is described as follows:

77⇆35832577

If the length of the short number is 5, e.g. called short number 77404 the number is translated to 35832577404, so the 77 is cut from the beginning of the called number and the rest is pasted to after the long number.

Figure 2:
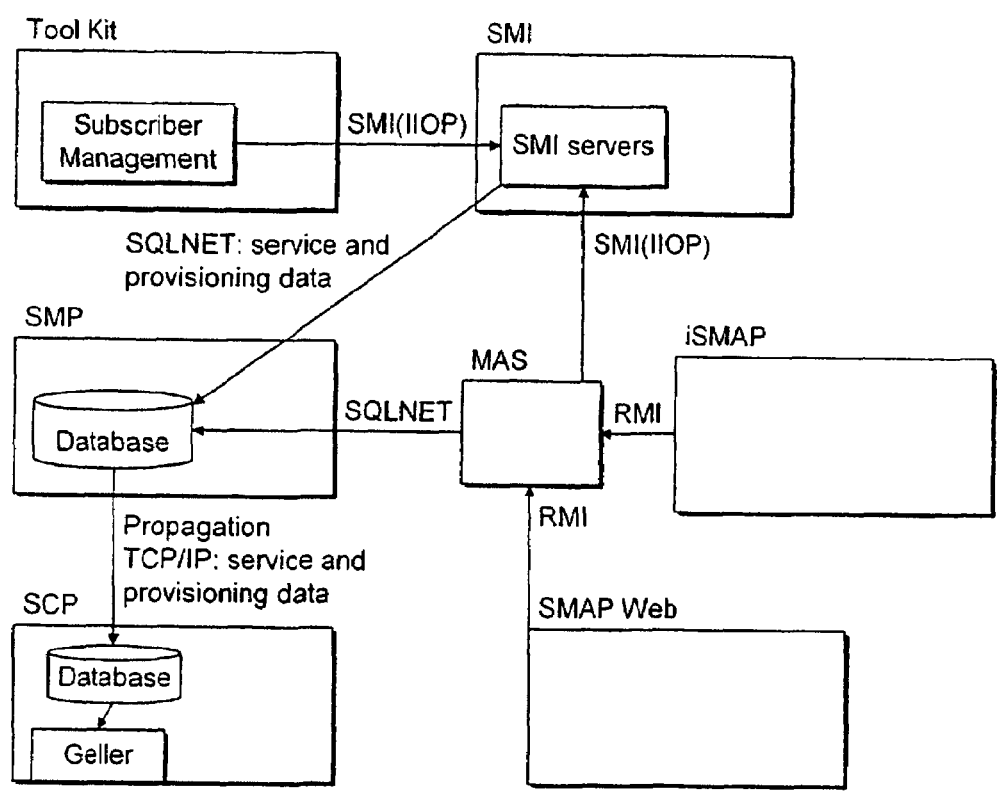
FIG. 2 illustrates subsystem interaction.

FIG. 2 shows the basic architecture of the system according to the present example. Preferred features of the system for implementing the present invention are:
1. The service logic must be able to form directory numbers from the short numbers inside a number range according to the number translation rule.
2. The service logic must be able to form short numbers from the directory numbers inside a number range according to the number translation rule.
3. It must be possible to define that calls made by directory numbers to the group members inside number ranges are handled as an on-net calls.
4. The service logic must be able to handle services provisioned to the number ranges in the same way as the services provisioned to the individual subscribers according to the priorities of the services and normal interaction rules. Services are always executed for the most accurate found subscriber number.

5. The subscriber can have both individual and number range services provisioned. These services are handled normally according priorities and interaction rules.
6. If the same service is provisioned to the individual subscriber and the number range including this subscriber only the individual service is executed.
7. If the subscriber has been defined to be the group member both individually and inside some number range only the individual values are used (e.g. class information). The individual member must exist in the group and the service needs to be provisioned to this number. Always the most accurate number is found from provisioning data and group member data.
8. The service logic must be able to handle number ranges defined with a wild card. The maximum number of digits which can be replaced with the wild card is at least four. So the number range 35832577* includes:
358325770-358325779
3583257700-3583257799
35832577000-35832577999
358325770000-358325779999
No wild cards used. Same functionality still achieved. The amount of replaceable digits is not restricted.
9. There can not be several overlapping number ranges in one group. There can be subgroups. The most accurate number range which matches is used.
10. If the subscriber language has been defined for an individual subscriber, it is always used instead of language given for the number range in the service provisioning. The service needs to be provisioned to the individual subscriber.
11. The same handling of number ranges must be able to be used also in CAMEL services.
12. The group administrator must be able to modify class of the number range. Group administrator is able to change class of the number range via iSMAP (internet enabled Service Management Access Point).
The group administrator must be able to modify the short number part in number translation rule of number range. For example group administrator can change translation rule of number range:
Change: 77*→358 3 257 7*
To: 45*→358 3 257 7*
It must be restricted that only the short number can be changed by the group administrator.
13. The group administrator must not be able to modify the directory number part in number translation rule of the number range.
14. When the group administrator browse the groups and group members one number range is handled as one entry, just like individual subscriber.
15. If the result of a search made by the group administrator (e.g. according to the class) is a number range and there is a group member inside that number range having individual definitions so that the individual group member is not included to the search (e.g. has different class than the number range) a notification has to be given to the group administrator, so that administrator can decide for possible further actions.
16. The service provider must be able to use a wild card in the provisioning and group definition to define numbers ranges. The maximum number of digits which can be replaced with the wild card is at least four. So the number range 35832577* includes:
358325770-358325779
3583257700-3583257799
35832577000-35832577999
358325770000-358325779999
17. The service provider must be able to add number ranges to the group and define individual translation rule for every number range. There can exist translation rule for each number range inside one group.
18. It should not be possible to define overlapping number ranges in one group. Though the same number range can be a member in several different groups.
19. It should be possible to add an individual group member to the same group with number ranges. Individual group member can overlap with number range inside the same group.
20. The number range is handled as an individual group member, when defining and handling the group.
21. The number range is handled as individual subscriber in provisioning.
22. The service provider must be able to provision the same service to individual subscribers and number ranges including the subscriber. If the subscriber should have some individual data the services must be provisioned to this subscriber individually.
23. The service provider must be able to provision both number range and individual services to the subscribers.
24. It should not be possible to use overlapping number ranges regardless of services in provisioning.
25. The group members inside the number ranges are always actual group members. The number ranges can not be used when virtual group members are defined. The virtual group members must be added to the group one by one.

The service logic is able to handle services which are provisioned to number ranges. A number range is treated like a subscriber. A number range can have group services or individual services provisioned. It should be possible to have subgroups and individual subscribers having services provisioned to them inside the number range. This can be achieved so that the services are always executed to the most accurate number found from tables of "DirectoryNumber" and "DirNumRange". For example if subscriber A which is number range (=35832577) has service S1 provisioned. Subscriber B which is number range (=358325771) and subgroup of A and has service S2 provisioned. The subscriber number calling is 35832577105 and the most accurate number range 358325771 service S2 is executed.

Figure 3:
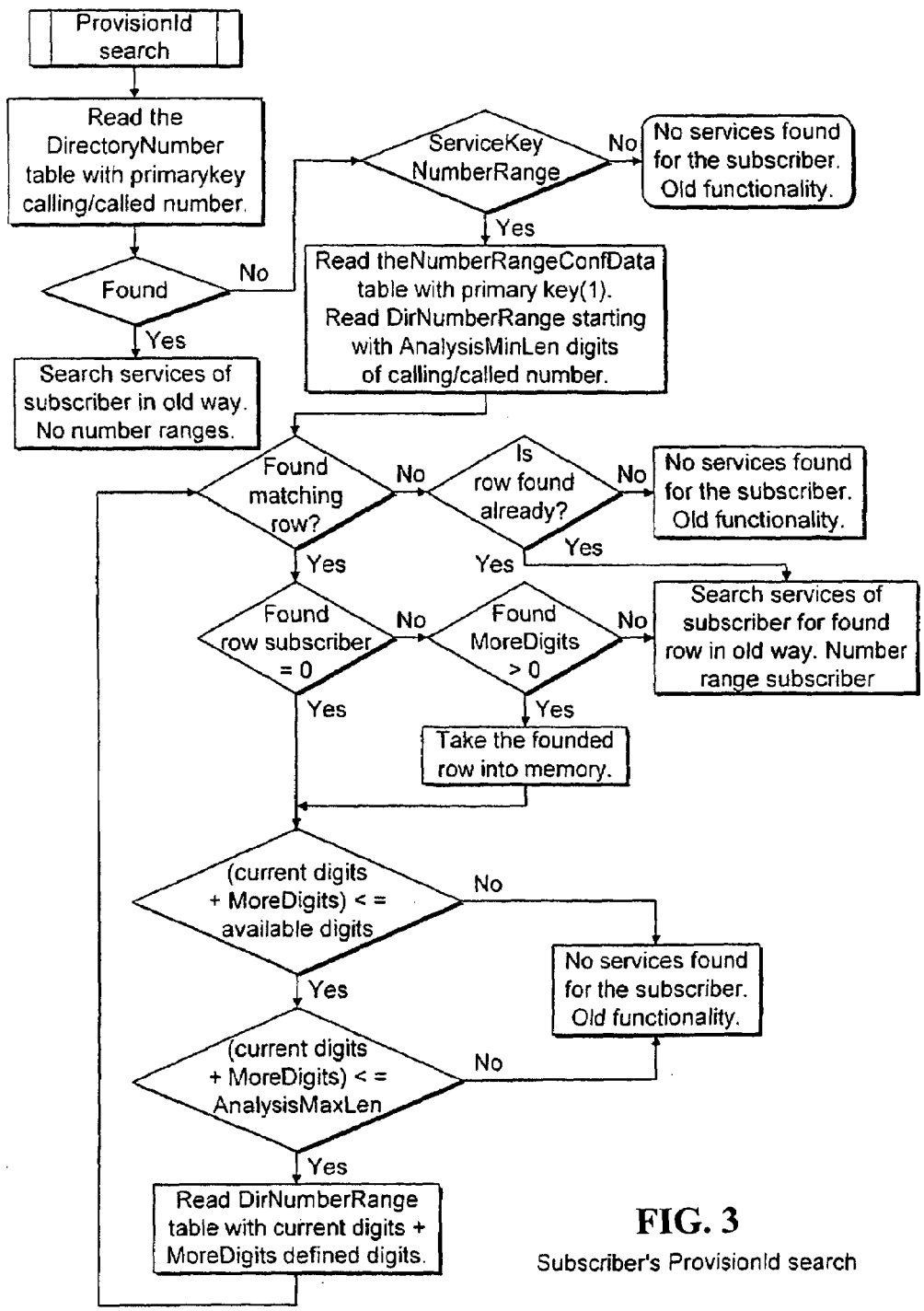
FIG. 3 illustrates a search for subscriber's ProvisionId.

The DirNumRange table is read only if the ServiceKey contains bit 17 with value 1. When triggering happens the subscribers ProvisionId can be found in the following way, as described with reference to FIG. 3.

A subscriber is searched from DirectoryNumber table with calling number in originating services and with called number in terminating services. If number is found from the DirectoryNumber table, the service logic continues the execution as in J4. If the number is not found the ServiceKey 17 bit is checked. If the. 17 bit has value 0 the subscriber has no IN services and it is treated as in J4.

If the 17 bit has value 1 the DirNumberConfData is read with primarykey(1).

DirNumberRange is read with AnalysisMinLen amount of digits of the calling or called number.

If matching row cannot be found, the service logic continues the execution as in J4 when the subscriber cannot be found from the database.

If matching row can be found the MoreDigitsMask is checked if the 4 bit has value 0, then more digits are needed to be checked. Then it is checked if current digits and digits value of bits 0-3 is less or equal than available digits. If yes then the number length is known. Then it is needed to be checked that current digit summed with defined digits in MoreDigitsMask is smaller than AnalysisMaxLen. If yes the number range can be searched with current digits summed with defined digits in MoreDigitsMask. If the length of the calling or called number is shorter than defined or AnalysisMaxLen is exceeded then the service logic continues the execution as in J4 when the subscriber cannot be found from the database.

If matching row can be found the MoreDigitsMask is checked if the 4 bit has value 1, then this row is potential number range subscriber and it is stored into the memory. Then it is checked if the value of bits 0-3 if the value is bigger than 0. If yes then the number length is known and that amount of digits can be added to the current digits number in previous search to find the row from DirNumberRange table.

If matching row can be found the MoreDigitsMask is checked if the 4 bit has value 1, then this row is potential number range subscriber and it is stored into the memory. Then it is checked if the value of bits 0-3 the value is bigger than 0. If no then the number in this row is the number range subscriber and the service logic continues the execution as in J4 with individual subscriber.

If matching row has been found once and that was stored into memory and more deeper number range was searched and was not found the stored row contains the number range subscriber information and the service logic continues the execution as in J4 with individual subscriber.

Data on the group and group member are stored into new tables GroupConfData, NewGroupMember, MemberAnalysis and ShortNumberAnalysis if new structure is wanted to be used. Group and group members can exists in these new tables only if from GroupConfData can be found a row with the GroupId in question. The GroupId can have been found in the conventional way from ServicesOfSubscriber table after the subscriber has been found. The most accurate number is found from the service provision data and the group member data both with short numbers and directory numbers.

FIGS. 4 to 7 illustrate how it is checked if a calling or called party is the member of the group.

Figure 4:
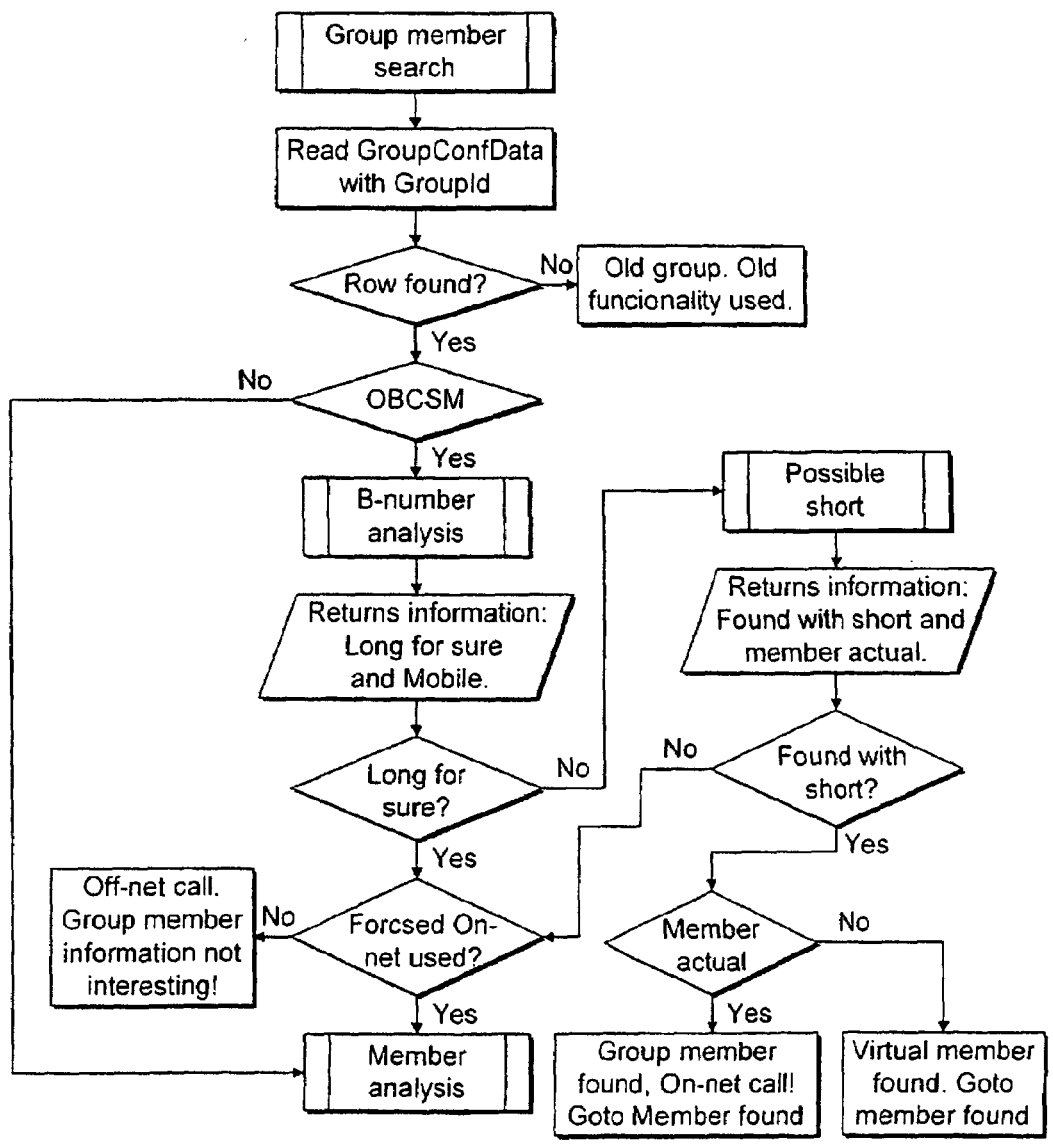
FIG. 4 illustrates group member search.

Referring to FIG. 4, using the GroupId found from ServicesOfSubscriber table as a primarykey the GroupConfData is read. If the row is not found, then conventional techniques to determine which service to provide can then be used. If the row is found the configuration data is read and stored for later usage.

Then it is checked whether the service started in OBCSM. If no the search continues in the Member analysis. If yes the B-number is analysed.

The B-number analysis should return the called number in international format, if the calling party is mobile and information if the number is long for sure. (Long for sure is e.g. number received from MSC/SSP in international format.)

Then it is checked if the number is long for sure. If no analysis is continued in Possible short. If yes it is checked if Forced On-net Short Numbers service parameter FDE is selected into the service. If no the call is Off-net call and this feature is not interested of the number anymore. If yes the analysis is continued in the Member analysis.

Possible short returns information if the member was found with short number and the member type (actual or not).

If the member is not found with short execution returns to checking of usage of Forced On-net Short Numbers.

If member is found it is checked if the member is actual or not. If the member is actual the call is interpreted to be On-net call, short numbers used and that information is transferred to Member found in needed point.

If member is found and the member is not actual the call is interpreted to be call to virtual member with short number and that information is transferred to Member found in needed point.

Figure 5:
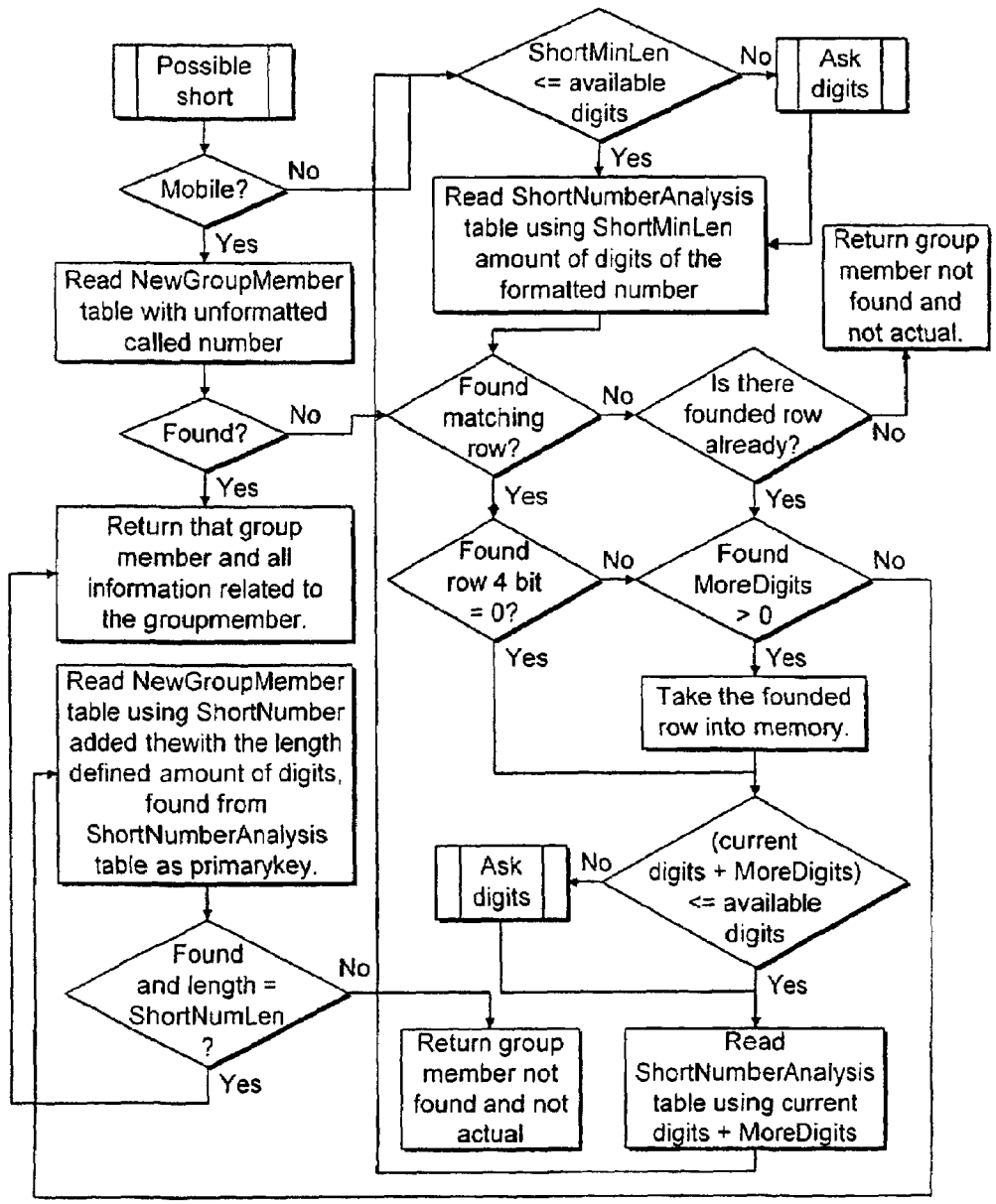
FIG. 5 illustrates a possible short number search.
Figure 6:
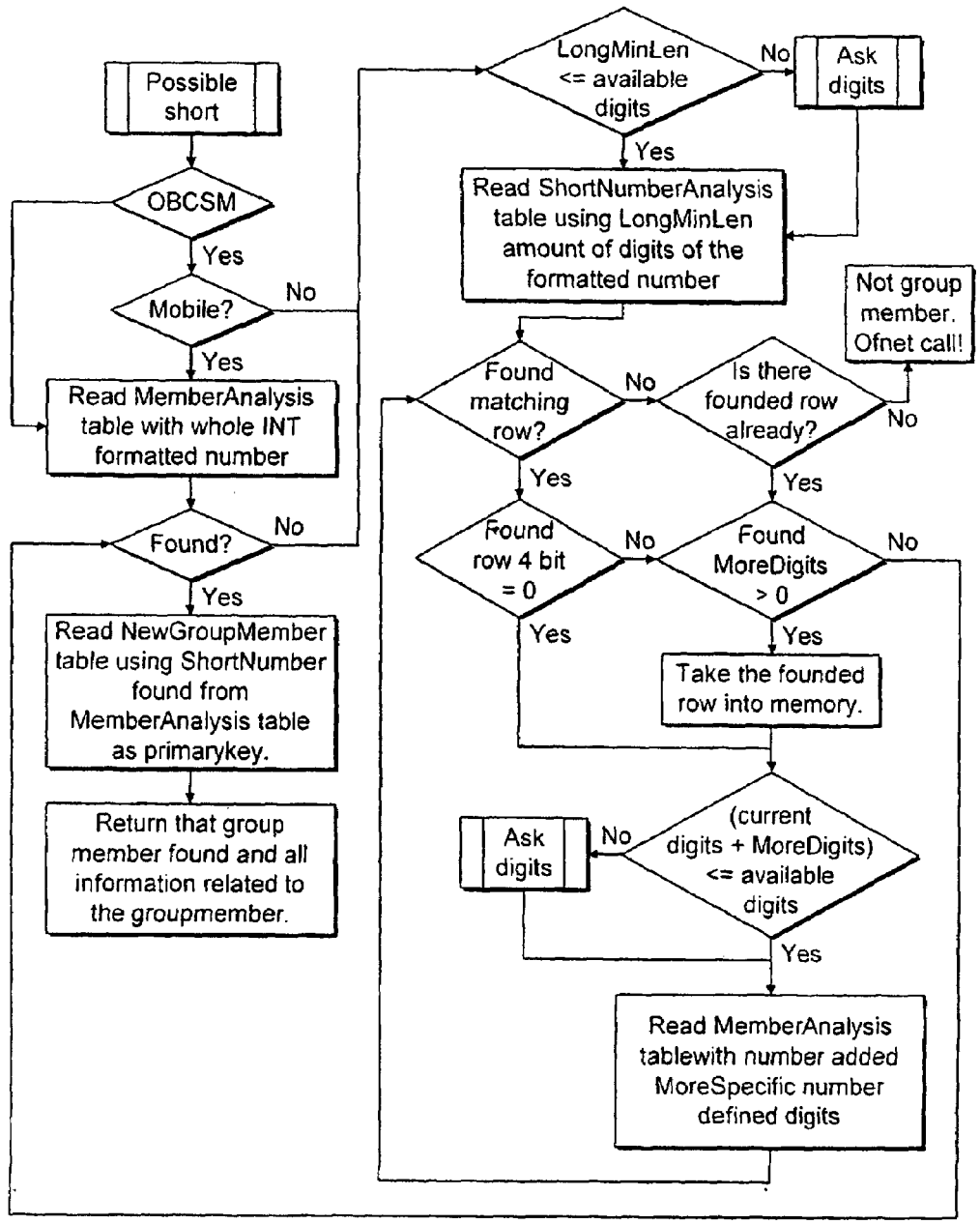
FIG. 6 illustrates a member analysis process.

FIG. 5 shows a possible short number search and is explained below:

First it is checked if the calling party is mobile.

If yes the NewGroupMember table is read using the called number received in InitialDp. If the member is found, then is checked the member type of the member and that information with found with short is returned. If no continued as in 3.

Then it is checked if the ShortMinLen is less or equal than the available digits. If no required digits are asked from the switch. After digits are received execution continues in 4.

if yes the ShortNumberAnalysis table is read by using ShorLMinLen defined amount digits as primarykey.

If matching row can be found the MoreDigitsMask is checked if the 4 bit has value 0, then more digits are needed to be checked. Then it is checked if current digits and digits value of bits 0-3 is less or equal than available digits. If yes then the number length is known. Then it is needed to be checked if current digits+MoreDigits is less or equal than available digits. If yes the number range can be searched with current digits summed with defined digits in MoreDigitsMask. If no more digits are asked from the switch.

If matching row can be found the MoreDigitsMask is checked if the 4 bit has value 1, then this row is potential member and it is stored into the memory. Then it is checked if the value of bits 0-3 if the value is bigger than 0. If yes then the number length is known and that amount of digits can be added to the current digits number in previous search to find the row from NewGroupMember table.

If matching row can be found the MoreDigitsMask is checked if the 4 bit has value 1, then this row is potential number range subscriber and it is stored into the memory. Then it is checked if the value of bits 0-3 the value is bigger than 0. If no then this number is used as primarykey to find the member from NewGroupMember.

If matching row has been found once and that was stored into memory and more deeper number range was searched and was not found the stored row contains the number in memory is used as primarykey to find the member from NewGroupMember.

If member is found then is checked that the length of the shortnumber is equal to ShortNumLen. If yes then this number is a member and member type of the member and information found with short is returned. If no then this is not short number and not found and not actual is returned.

For Translation and CLI modification when a group member has been found, the group member must be able to find even the members number range. These number ranges have translation rules from directory number to short number and vice versa. The translation rule is defined in the database table NewGroupMember, there is the field IsTranslation which defines if the translation rule exists or not. Translation rule itself contains information in field Number (short number), LongNumber (number range) and ShortNumLen. Number field defines which part of the short number is replaced with Information in LongNumber. The ShortNumLen field tells then the length of the short number and so defines that only correct length numbers are converted from short to long and LongNumLen defines the same for long numbers. For example if following data can be found from the database

| GroupId | Number | LongNumber | Member Type | IsTranslation | ShortNumLen | LongNumLen |
|---------|--------|------------|-------------|---------------|-------------|------------|
| 1 | 74 | 35832574 | Actual | Yes | 5 | 11 |

VPN group member A calls to group member B with 74234.

B is found to be a group member. It is checked that called short number has the same length as defined in the database.

From short number 74234 from the beginning is removed Number 74 and the rest (234) is pasted to the end of LongNumber. It is checked that length of the number is 11.

The number in Connect is then 35832574234.

Figure 7:
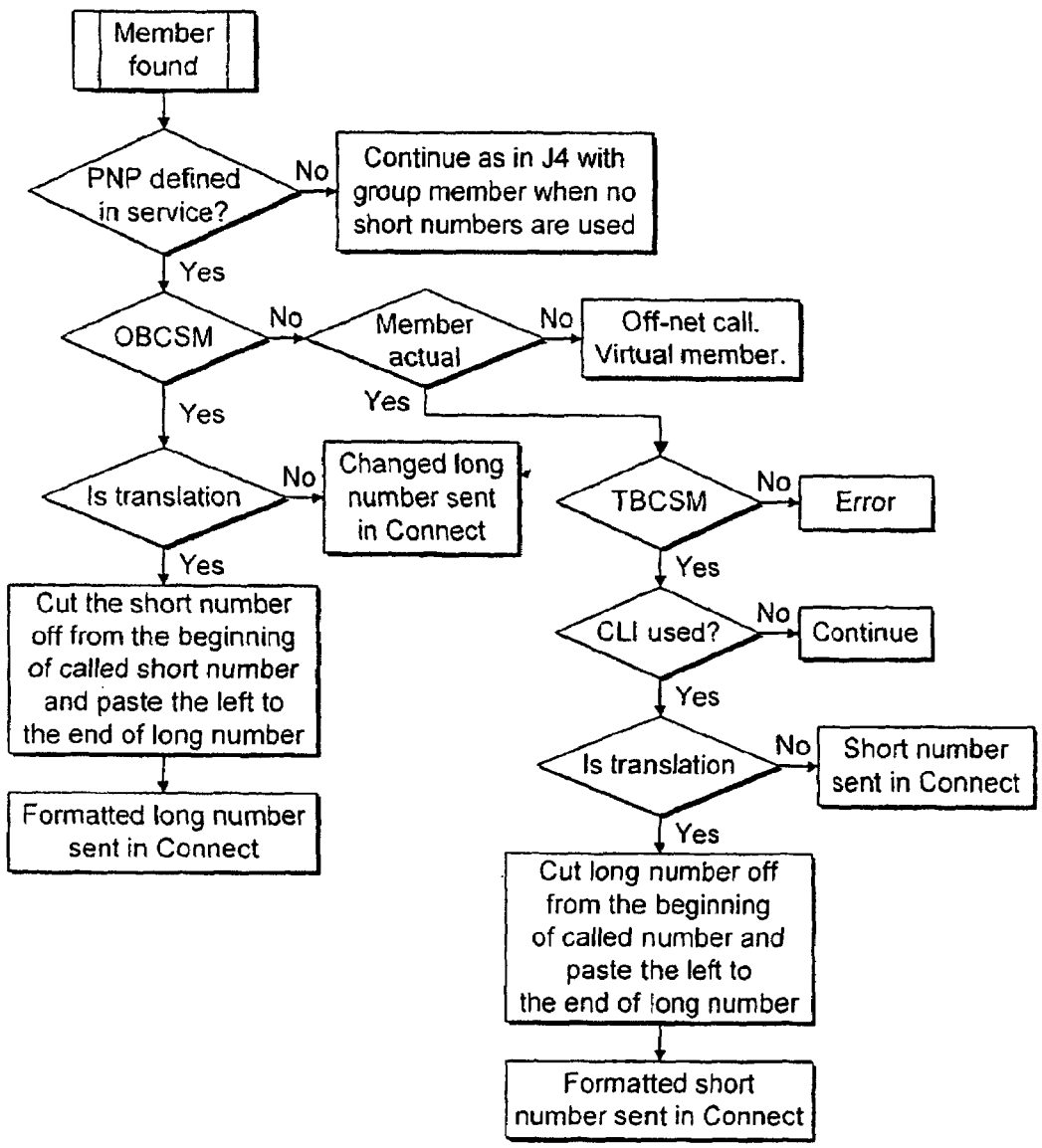
FIG. 7 illustrates a member found process for number translation.

FIG. 7 shows a more generic view.

It is greatly preferred that always the most accurate directory number or directory number range must be found together with the ProvisionId for that subscriber. Number range is treated as subscriber and has all information of the subscriber in the subscriber table.

As regards implementation, the basic idea is that each number range is seen as an individual subscriber or group member and all that can be done in respect of the subscriber or group member should be capable of being done in respect of a number range. Tool kit tools must support both old database structure and this new structure. Group member can belong to both structures inside the same SCP, then of course the group member must be a member of two different groups. Members of the same group can belong only to old structure or new, but not both. The services are executed always to the most accurate number and the group member is found always with the most accurate number possible.

When a service provider wants to create a group with a number range the configuration data can be stored first. Then the number range group member is entered as one row entry, all old data of the group member is of course entered also e.g.:

| Long number | Long number length | Short number | Short number length | Translation |
|-------------|--------------------|--------------|---------------------|-------------|
| 35832577 | 11 | 77 | 5 | Yes |
| 35832577066 | 11 | 77066 | 5 | No |

-continued

| Long number | Long number length | Short number | Short number length | Translation |
|-------------|--------------------|--------------|---------------------|-------------|
| 358325772 | 11 | 772 | 5 | Yes |
| 358405722977 | 12 | 8874234 | 7 | No |

When group members are listed/browsed the number range is seen as one entry. SMI should take care of inserting required digits into analysis tables. The most accurate member should be on top of listing when group is browsed after saving.

The service provider must be able to provision services to number ranges. There can exists overlapping number ranges, same number range can exists with only one ProvisionId like individual subscriber. Originating services and Terminating services can be provisioned to number range subscriber, but not Universal Access or Location Update services.

Before the number range can be provisioned the DirNumberConfData must be configured. This can be done with Provision Tool and only network operator is allowed to execute this configuration. This configuration data is required before provisioning because that data is needed to fill the database so that there does not exist gaps.

If it is wanted that sub group or individual subscriber has different services or different provisioning values than the service provisioned to the number range within the sub group or individual subscriber belongs to. These services must be provisioned individually to the sub group or to the individual subscriber. For example if number range 35832577 has service S1 and individual subscriber 35832577066 need to have different announcement in service S1, this service S1 must be provisioned to this individual subscriber and this individual subscriber is not any more affected with changes of provisioning data of the number range.

SMI should take care of inserting required digits into analysis tables. The most accurate member should be on top of listing when subscribers are browsed after saving.

A SMAP (Service Management Access Point) web subsystem may be provided. Then preferably new information about the groups can be entered via SMAP web. All information must be able to be entered into GroupConfData table. If the groups are wanted to use this VPN large number or PBX support function it must be decided before group members are entered into the group. So there must exist selection if new or old structure is used in this group. The group configuration data must also be entered before entering group members, because the MemberAnalysis and ShortNumberAnalysis tables are filled with required digits to avoid gaps and the configuration data is used there. This avoiding of gap ensures the effective service logic functionality. If there exists gaps the searching of group members in service logic won't work as described in previous chapters. iSMAP must support both old database structure and this new structure. Group member can belong to both structures inside the same SCP, then of course the group member must be a member of two groups. Members of the same group can belong only to old structure or new, but not both The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A communications system configured to provide services to communication terminals, the communications system comprising:
   a service provision unit configured to provide services to the terminals and directing a charge of a call to a sponsoring party distinct from subscribers of the terminals, wherein the service provision unit directs the charge of the call to be made for multiple accounts and tariffs, and each terminal is addressable by means of an address; and
   a service data storage unit configured to store a set of service provision definitions, each service provision definition comprising a service field storing an indication of a service and an address field storing an expression specifying the address of one or more of the terminals; and
   a service logic unit configured to receive communications in the system and compare an address specified in a communication with the expressions stored in the address fields of each of the service provision definitions and on the basis of that comparison causing the service provision unit to provide a service to the terminal identified by the said address.

2. A communications system as claimed in claim 1, wherein at least one of the said service provision definitions stores an expression specifying the address of more than one terminal.

3. A communications system as claimed in claim 2, wherein the said expression is a wildcard expression.

4. A communication system as claimed in claim 2, wherein the said expression defines a set of numerically contiguous addresses.

5. A communication system as claimed in claim 2, wherein the said expression defines a set of addresses of which the first part of each is the same.

6. A communications system as claimed in claim 1, wherein each address is a number.

7. A communications system as claimed in claim 6, wherein each address is or comprises an Mobile Station International Subscriber Directory Number (MSISDN).

8. A communications system as claimed in claim 1, wherein the communication is a voice communication.

9. A communications system as claimed in claim 1, wherein the terminals are mobile stations.

10. A communications system as claimed in claim 1, wherein the service logic unit is configured to, if the said address matches the expression stored in the address field of any of the service provision definitions, cause the service provision unit to provide the service indicated in that definition.

11. A communications system as claimed in claim 1, wherein the service logic unit is configured to, if the said address matches the expressions stored in the address field of more than one of the service provision definitions, prioritize the services indicated in those definitions according to predetermined rules and on the basis of those rules cause the service provision unit to provide a subset of the services indicated in those definitions.

12. A communications system as claimed in claim 10, wherein the service logic unit is configured to cause the service provision unit to provide the service/services indicated in that/those definitions to a party to the communication.

13. A communications system as claimed in claim 1, wherein the service logic unit is configured to compare the address of the originating party of the communication with the expressions stored in the address fields of each of the service provision definitions and on the basis of that comparison causing the service provision unit to provide a service to the terminal identified by the said address.

14. A communications system as claimed in claim 13, wherein the said address is an A number.

15. A communications system as claimed in claim 1, wherein the service logic unit is configured to compare the address of the terminating party of the communication with the expressions stored in the address fields of each of the service provision definitions and on the basis of that comparison causing the service provision unit to provide a service to the terminal identified by the said address.

16. A communications system as claimed in claim 15, wherein the said address is a B number.

17. A communications system as claimed in claim 1, which accords to the Global System for Mobile Communications (GSM) standard.

18. A service provision unit in a communications system, the communications system comprising:
   a service data storage unit configured to store a set of service provision definitions, wherein each service provision definition comprises a service field storing an indication of a service and an address field storing an expression specifying an address of one or more terminals, and the communications system is configured to provide services to communications terminals, each terminal being addressable by means of the address; and
   a service logic unit configured to receive communications in the system and compare an address specified in a communication with the expressions stored in the address fields of each of the service provision definitions and on that basis of that comparison authorize the service provision unit to provide a service to the terminal identified by the said address, wherein the service provision unit is configured to
   provide services to the terminals responsive to receiving authorization from the service logic unit and direct a charge of a call to a sponsoring party distinct from subscribers of the terminals, and direct the charge of the call to be made for multiple accounts and tariffs.

19. A communications system for providing services to communication terminals, the communications system comprising:
   service provision means for providing services to the terminals and directing a charge of a call to a sponsoring party distinct from subscribers of the terminals, wherein the service provision unit directs the charge of the call to be made for multiple accounts and tariffs, and each terminal is addressable by means of an address; and
   service data storage means for storing a set of service provision definitions, each service provision definition comprising a service field storing an indication of a service and an address field storing an expression specifying the address of one or more of the terminals; and service logic means for receiving communications in the system and compare an address specified in a communication with the expressions stored in the address fields of each of the service provision definitions and on the basis of that comparison causing the service provision unit to provide a service to the terminal identified by the said address.

20. A service provision unit in a communications system, the communications system comprising:

service data storage means for storing a set of service provision definitions, wherein each service provision definition comprises a service field storing an indication of a service and an address field storing an expression specifying an address of one or more terminals, and the communications system provides services to communications terminals, each terminal being addressable by means of the address; and service logic means for receiving communications in the system and compare an address specified in a communication with the expressions stored in the address fields of each of the service provision definitions and on that basis of that comparison authorize the service provision unit to provide a service to the terminal identified by the said address, wherein the service provision unit is configured to provide services to the terminals responsive to receiving authorization from the service logic unit and direct a charge of a call to a sponsoring party distinct from subscribers of the terminals, and direct the charge of the call to be made for multiple accounts and tariffs.

* * * * *